US012315009B2

(12) United States Patent
Glover et al.

(10) Patent No.: US 12,315,009 B2
(45) Date of Patent: May 27, 2025

(54) SELECTION OF CRYPTOGRAPHIC IDENTIFIERS IN A BLOCK (71) Applicant: DMG Blockchain Solutions Inc., Delta (CA)

(72) Inventors: Adrian Glover, Surrey (CA); Sheldon Bennett, Surrey (CA); James Stafford-Coyte, Vancouver (CA)

(73) Assignee: DMG BLOCKCHAIN SOLUTIONS, INC. (CA)

( * ) Notice: Subject to any disclaimer, the term of this patent is extended or adjusted under 35 U.S.C. 154(b) by 111 days.

(21) Appl. No.: 18/160,281

(22) Filed: Jan. 26, 2023

(65) Prior Publication Data
US 2023/0177607 A1 Jun. 8, 2023

Related U.S. Application Data (63) Continuation of application No. PCT/US2021/043546, filed on Jul. 28, 2021, which is
(Continued)

(51) Int. Cl.
*G06Q 20/00* (2012.01)
*G06F 16/951* (2019.01)
*G06Q 20/06* (2012.01)
*G06Q 20/36* (2012.01)
*G06Q 20/40* (2012.01)
(Continued)

(52) U.S. Cl.
CPC ........... *G06Q 40/04* (2013.01); *G06F 16/951* (2019.01); *G06Q 20/0655* (2013.01); *G06Q 20/3674* (2013.01); *G06Q 20/4016* (2013.01); *G06Q 30/0185* (2013.01); *G06Q 50/265* (2013.01); *H04L 9/0637* (2013.01); *G06F 40/40* (2020.01); *G06Q 2220/00* (2013.01); *H04L 9/50* (2022.05)

(58) Field of Classification Search
CPC ............... G06Q 40/04; G06Q 20/0655; G06Q 20/3674; G06Q 20/4016; G06Q 30/0185; G06Q 50/265; G06Q 2220/00; G06Q 20/065; G06F 16/951; G06F 40/40; H04L 9/0637; H04L 9/50; H04L 2209/56
USPC .................. 705/16, 21, 59; 380/44, 262, 278
See application file for complete search history.

(56) References Cited

U.S. PATENT DOCUMENTS

2018/0109541 A1    4/2018  Gleichauf
2018/0139278 A1*   5/2018  Bathen .................. H04L 9/3247
(Continued)

OTHER PUBLICATIONS

Tales from the Crypt: A Bitcoin Podcast, Rabbit Hold Recap: Week of Jul. 6, 2020.
(Continued)

*Primary Examiner* — Dante Ravetti
(74) *Attorney, Agent, or Firm* — PERKINS COIE LLP; Colin Fowler; Aidan Faustina (57) ABSTRACT

A method for detecting and tracking tainted cryptographic wallets. The method measures a wallet's propensity to engage in criminal or suspicious activity. Naturally, transacting with a criminal is tantamount either to funding crime or laundering its proceeds, so it is in our collective interest to identify—and then monitor or quarantine—any wallet with criminal association. The method also automatically flags risky withdrawal requests in real-time for further review before committing them to the blockchain. In some embodiments, the exchange can quarantine wallets at a certain AddressScore.

20 Claims, 5 Drawing Sheets

Related U.S. Application Data a continuation of application No. 16/941,380, filed on Jul. 28, 2020, now abandoned.

(51) Int. Cl.
| | | |
|---|---|---|
| *G06Q 30/018* | (2023.01) | |
| *G06Q 40/04* | (2012.01) | |
| *G06Q 50/26* | (2012.01) | |
| *H04L 9/06* | (2006.01) | |
| *G06F 40/40* | (2020.01) | |
| *H04L 9/00* | (2022.01) | |

(56) References Cited

U.S. PATENT DOCUMENTS

| | | | |
|---|---|---|---|
| 2018/0247191 A1 | 8/2018 | Katz et al. | |
| 2019/0279215 A1 | 9/2019 | Kuchar et al. | |
| 2020/0167779 A1* | 5/2020 | Carver | G06Q 20/3829 |
| 2020/0396065 A1 | 12/2020 | Gutierrez-Sheris | |
| 2021/0194672 A1 | 6/2021 | Narayanam et al. | |

OTHER PUBLICATIONS

Dos Santos, ("An Efficient Miner Strategy for Selecting Cryptocurrency Transactions", downloaded from https://ieeexplore.ieee.org/stamp/stamp.jsp?tp=&amnumber=8946174, attached as PDF file, dated 2019 (Year: 2019).

OFAC, ("OFAC's Proposed Virtual Currency Blacklist Could Complicate Sanctions, Crypto Compliance", dated Mar. 29, 2018, downloaded from https://www.acfcs.org/ofacs-proposed-virtual-currency-blacklist-could-complicate-sanctions-crypto-compliance/ and attached as PDF file (Year: 2018).

Lee, "Cybercriminal Minds: An Investigative Study of Cryptocurrency Abuses in the Dark Web", dated 2019, downloaded from https://www.ndss-symposium.org/wp-content/uploads/2019/02/ndss2019_09-1_Lee_paper.pdf and attached as PDF file (Year: 2019).

Ipeirotis, "Analyzing the Amazon Mechanical Turk Marketplace", predating 2012; downloaded from https://archive.nyu.edu/bitstream/2451/29801/4/CeDER-10-04.pdf attached as PDF file; Wayback screen shot also provided for date proof (Year: 2012).

Hinkes, Andrew, et al., "OFAC's Bitcoin Blacklist Could Change Crypto," 2018 (26 pages).

Deneuville, "An in-depth guide into how the mempool works", downloaded from https://blog.kaiko.com/an-in-depth-guide-into-how-the-mempool-works-c758b781c608 and attached as a PDF file, dated Oct. 12, 2016 (Year: 2016).

"Mastering the Mempool: Your Intro to In-Flight Transactions", (downloaded from https://www.blocknative.com/blog/mempool-intro, two pages attached as two Snag It pdf files, dated Jan. 14, 2020 (Year: 2020).

* cited by examiner

SELECTION OF CRYPTOGRAPHIC IDENTIFIERS IN A BLOCK

CROSS-REFERENCE TO RELATED APPLICATIONS

This application is a continuation of International Application No. PCT/US2021/043546, filed on Jul. 28, 2021, which is a continuation of U.S. patent application Ser. No. 16/941,380, filed on Jul. 28, 2020. The aforementioned applications are incorporated herein by reference in their entirety.

TECHNICAL FIELD

The disclosure relates to operation of a pool of hashing processors and more particularly to structural requirements of forming blocks in a blockchain data structure.

BACKGROUND

Some blockchains systems record movement of cryptographic objects between cryptographic identifiers and operate on distributed consensus networks. A blockchain is an immutable, append-only public ledger. A benefit of such a data structure is that is reliable, secure, and open. However, one of the benefits, specifically the anonymity of transaction has attracted criminals to the platform. Within the distributed consensus networks, there tend to be congregations of processing power referred to as pools. The pools use ASIC processors designed for hashing to more efficiently generate the block data structures from available events.

DETAILED DESCRIPTION

In block creation, a miner generally requests a "block template" from a full node on a distributed consensus network. This block template will have a list of events that exist in the mempool. The mempool is where all valid events wait to be confirmed by the entire distributed consensus network. Described herein a filter node will review the list of events, looping through each one as new events are added, and create a list of all the cryptographic identifiers that are associated with each event.

The list of cryptographic identifiers is used to make a query to a labels database and will receive a list of which of these cryptographic identifiers has a criminality score of 1. The addresses that meet these criteria will be mapped to their respective events and these specific events are relayed to the pool of hashing processors ("miners") and excluded from the next mined block generated by the pool. In some embodiments, these specific events that were excluded or avoided will still exist in the mempool and will either be again excluded in the future by pool of miners or confirmed and mined in a block by another pool or independent miner.

The emergence of cryptographic objects has posed problems for regulatory bodies. In some circumstances, it behooves users to cooperate with those regulatory bodies. In those circumstances, the distributed nature of the cryptographic objects impedes the ability to comply. An AddressScore measures an address's propensity to engage in criminal or suspicious activity.

Naturally, transacting with a criminal is tantamount either to funding crime or laundering its proceeds, so it is in the collective interest to identify—and then monitor or quarantine—any wallet with criminal association. Applied further, where hashing pools refuse to validate the actions of criminals (by excluding or blacklisting criminal addresses from inclusion into blocks), the system makes it more difficult for criminals to operate on the relevant distributed consensus network.

To vet an existing customer, an exchange or hashing pool (for example) would run AddressScore against the addresses associated with events in the mempool. In some embodiments, AddressScores are a value between 0 (safe) and 1 (criminal). The value may be a simple binary indicator, or a more nuanced scale. AddressScores may also be expressed as labels. A label is a human readable tag describing what an address has been used for (i.e., Drug trafficking), or who is the owner of a particular address (i.e., Exchange). Exchange's may be considered a 0, whereas Drug trafficking would fall under the criminal activity category and be given a risk of 1.

A filtering node associated with a hashing pool leverages the AddressScore in order to build OFAC compliant blocks with its pool software. This means that the blocks that the filtering node and hashing pool software mine exclude transactions that include any address that meet some threshold AddressScore (e.g., 1, 0.5, 0.6, 0.7, etc. . . . ).

Labels are collected from a variety of sources. The main 3 sources are, government new releases and websites, publicly available bitcoin blockchain explorer websites, and Mechanical Turks.

In some embodiments, labels are generated based on a web crawler that scrapes data and applies the relevant label and AddressScore to the address. The crawlers monitor different websites that provide information related to specific cryptographic identifiers. These websites vary from government-owned and exchange owned, to blockchain explorers.

In some embodiments, labels are generated through the use of Mechanical Turks. The Mechanical Turks operate campaigns where workers are incentivized to provide screenshots of cryptographic identifiers related to a particular exchange. These addresses tend to be labelled as exchange and usually have an AddressScore of 0. In addition to the methods mentioned, in some embodiments, a web crawler applying a natural language processor seeks find news articles that have information that may lead to input into the database of a given address. Any combination of the described sources used are added to the database along with the address, label, AddressScore, and a confidence level.

Terminology

An entity is any person or company, or merely a reference to either, that owns the private keys to a public address (cryptographic identifier). Examples are: Mrs. Jones, Binance Exchange, 2016 Bitfinex Thief.

The Bitcoin mempool (short for memory pool) is a collection of all Bitcoin transactions ("event") awaiting verifications and confirmation which will be included in the next block. Whenever a Bitcoin transaction is channeled to the network, it first gets verified by all the Bitcoin nodes available, which takes an average of 10 minutes to get its first verification. It can take longer than 10 minutes, depending on the pending transactions that are in the mempool. Mempool is the node's maintaining and restraining area that focuses on transactions awaiting approval. When one transaction gets verified and included, the next one is in line to get added. Cryptocurrencies other than Bitcoin operate using mempools as well. Bitcoin is referenced here as an example.

The collection of these transactions is called a "block" and whichever miner first solves the math problem gets to add this block to Bitcoin's blockchain. However, if the size of the Bitcoin mempool is high, transaction fees recommended by exchanges go up to improve the rate. A given user is enabled to choose how expensive they wish to transaction fee to be. If one sets the fee higher than average, chances are that transaction will be confirmed quicker. Failing to attach high fees could result in a transaction being delayed for many days if the memory pool does not clear.

An Exchange is an entity that operates a plurality of addresses. Even though a customer of an exchange is given a deposit address, the address is truly owned by the exchange rather than by the customer, since the exchange controls the private keys to that address.

Each entity belongs to one of a definitive set of categories. Some illustrative examples include: exchange, gambling site, dark market, scammer or mixer. A category may be assigned a degree of criminality that in some embodiments, affect an initial AddressScore. For instance, the dark market category receives a high initial score (e.g., near or above a criminality threshold), whereas a law enforcement agency a and private individuals have an inherent score of 0. An entity belonging to a category that has a higher initial score carries some intrinsic risk. Otherwise, it derives extrinsic risk from nearby entities having intrinsic risk.

A wallet is the set of addresses (or cryptographic identifiers) belonging to a single entity (or set of entities, to accommodate multisig addresses). In some instances, an entity has multiple wallets, as in the case of an exchange that stores some value in "cold" storage wallets, and some in "hot" storage. In a similar fashion to entities, wallets have either intrinsic or extrinsic risk.

Although one can partition addresses into wallets, there is difficulty identifying the entities that own them. However, the system can sometimes identify at least the category of the (unknown) entity that owns the wallet. Clues about the wallet's category often come from topological properties about its transactions. For example, to the extent that a given transaction exemplifies mixing, the system can then further infer that the input and output addresses belong to a mixer.

Finally, we define hops among entities (or wallets). Two entities are one hop from each other precisely when there exists a single transaction between them. This forms a directed graph of entities. We say that entities that are n hops away from one another if the shortest path connecting them (ignoring direction) has n edges.

A wallet's transactional neighborhood is the set of wallets that have transacted with the given wallet, plus those that have transacted with that wallet's transactors, and so on. While there is no strict limit to the number of hops that constitute the neighborhood, an intuitively definition is "less than the entire network of wallets, and more than just a single wallet."

Figure 1:
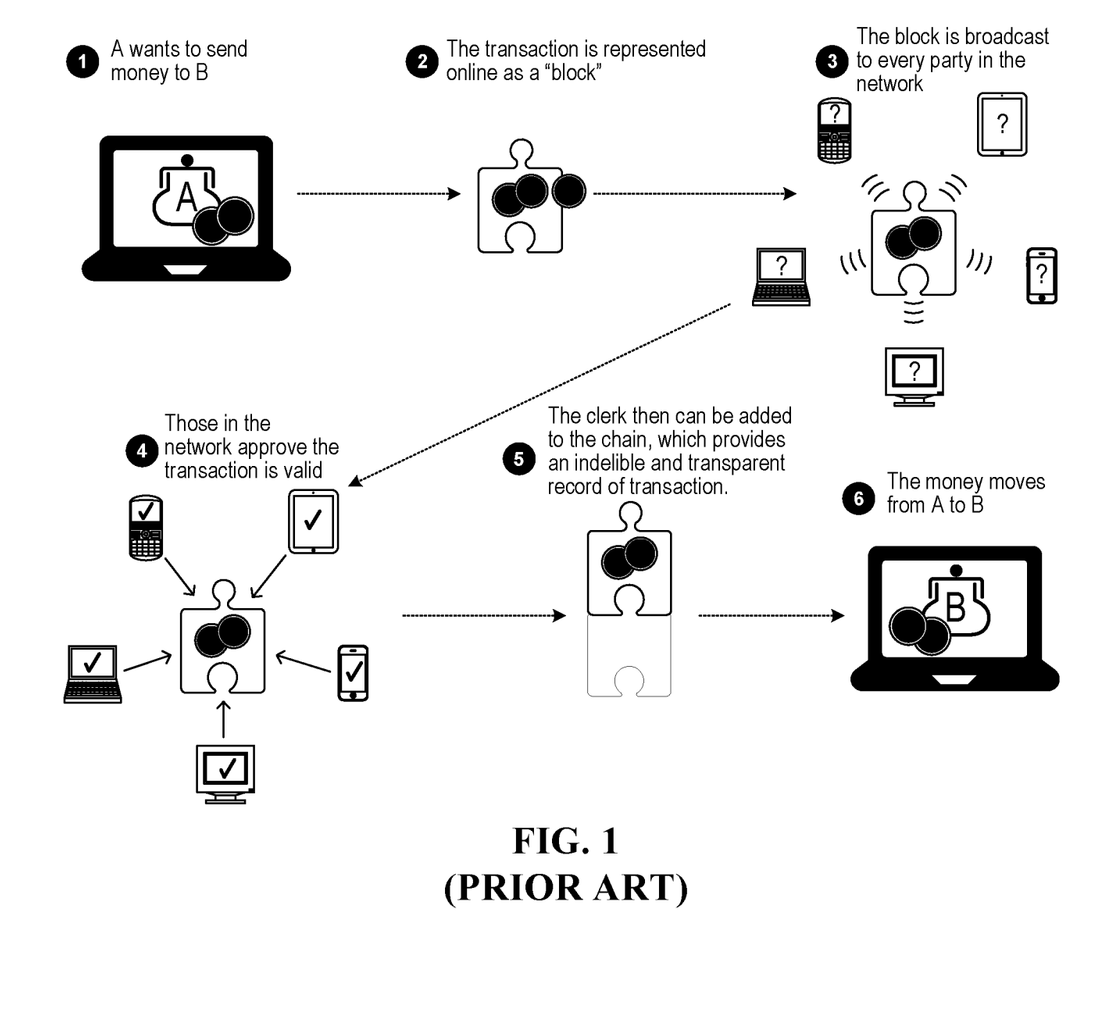
FIG. 1 is a block diagram of a blockchain data structure.

FIG. 1 is a block diagram of a blockchain data structure. Cryptocurrency networks operate on a distributed network architecture. Key to understanding cryptocurrency is the data structure upon which the network operates. For example, the Bitcoin and Ethereum networks use a data structure referred to as a blockchain.

The blockchain includes a history of all transactions that have ever occurred on the network. Each full node in the distributed network holds a full copy of the blockchain. To participate in the network at all, the blockchain history must be consistent with the history of at least a majority of other nodes. This consistency rule has an important effect of causing the blockchain to be immutable. In order to effectively attack a blockchain, one must control 51%+ of the processing power of the entire network. Where the network is comprised of thousands of nodes, assembling the requisite 51% is exceedingly difficult.

Many nodes tend to group together to form pools. Often these pools operate large warehouses of ASIC hashing processors, specifically designed to efficiently solve math problems that generate hash values. While it is true that many nodes often group together in pools that together work together to solve for nounces to propagate the blockchain, the grouped nodes of the pool do not necessarily share common control. While they have agreed to pay any mined coins to a central pot that is shared amongst the pool, this is far and away from agreeing to make changes to the blockchain.

When a given node intends to generate a transaction, the transaction is propagated throughout the nodes, via the mempool, until it reaches a node or group of nodes that can assemble that transaction and other transactions generated during a contemporaneous period of time into a block. Until a transaction appears in a block it is not published or public. Often a transaction isn't considered confirmed until 6 additional blocks have been added.

At the time of this filing, Bitcoin blocks are limited to the size of 1 MB and are generated approximately every 10 to 15 minutes. This illustrates an important limitation of the Bitcoin network, that it only processes approximately 7 transactions per second. Conversely, Ethereum limits block size based on the amount of processing the contracts in the given block call for and are appended every 5 to 15 seconds. While cryptocurrency networks technically begin processing transactions in real-time, and the existence of a block including a given transaction verifies that transaction's authenticity, until that block is published to the blockchain, the transaction is not verified.

Thus far, Bitcoin has been discussed as a network for trading Bitcoins. However, Bitcoin transactions have additional utility in that they can embed additional data. As contemplated above, Bitcoin can be used to purchase and record the existence of data at a given point in time. Recording data is performed by including hashed data within an output field of a given transaction. In this manner, the proof of existence for any document or recorded data may be embedded into the immutable history of the blockchain.

Systems that utilize the Bitcoin blockchain to transfer the ownership of non-coin assets require software that is separate from and merely relies upon the immutability of the blockchain. The separate software is not necessarily secure or immutable itself. Extra-blockchain software is thus an inherent weak point in a system that relies upon the immutability of the blockchain to ensure security. Ethereum takes the ability to buy and sell non-coin assets a step further.

Ethereum smart contracts are in effect software that runs on the blockchain. That software is open source and subject to inputs that are related to the blockchain itself. Of course, one can still write code including vulnerabilities, but the platform enables greater security and fewer weak links in the chain.

Figure 2:
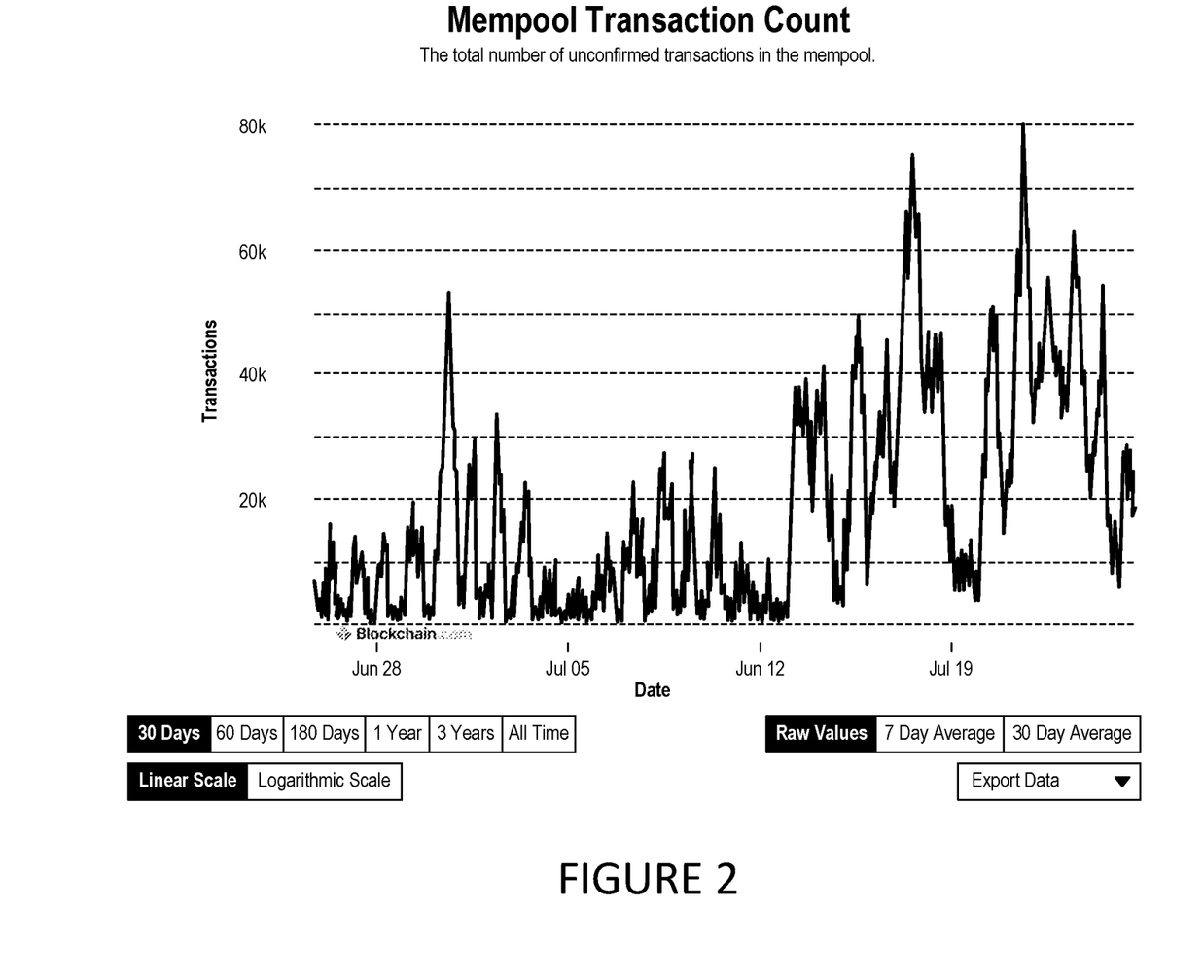
FIG. 2 is an illustration of a mempool.

FIG. 2 is an illustration of the Bitcoin mempool over time. The Bitcoin mempool is portrayed here as an example. Other cryptographic objects make use of similar mempools. The mempool is where all valid transactions wait to be confirmed by the cryptographic object network. A high number of transactions in the mempool indicates a congested traffic which will result in longer average confirmation time and higher priority fees. The mempool count metric tells how many transactions are causing the congestion whereas the mempool Size (Bytes) chart is a better metric to estimate how long the congestion will last.

In order to be confirmed, a transaction from the mempool needs to be included in a block. Unlike the maximum size of a block which is fixed, the maximum number of transactions which can be included in a block varies, because not all transactions have the same size.

Each Bitcoin node builds its own version of the mempool by connecting to the Bitcoin network. The illustrated mempool content is aggregated from a few instances of up to date Bitcoin nodes maintained by the Blockchain.com engineering team. However, in a disclosed filter node the mempool may look different based on the treatment of high AddressScore transactions/events.

In some embodiments, the filter node's mempool discards those transactions/events that include cryptographic identifiers with above threshold AddressScores. In other embodiments, those transactions remain in the mempool until some other node (not the filter node) incorporates them into a block. The resultant mempool may be smaller than the average mempool across the relevant distributed consensus network because some transactions are discarded, or the cumulative effect of the filter node selectively excluding transactions may lead to the cumulative mempool becoming much larger across the distributed consensus network.

The filter node makes use of a protocol that is compatible with protocols of existing nodes on large cryptocurrency networks such as Bitcoin and Ethereum. While the protocol of a filter node is custom, it is more restrictive that the protocol required by the Bitcoin and/or Ethereum specification and thus the filter node is enabled to share and receive potential transactions between mempools of the filter nodes and non-filter nodes. The changes to the protocol of filter nodes are made without the requisite consensus of the network at large.

Figure 3:
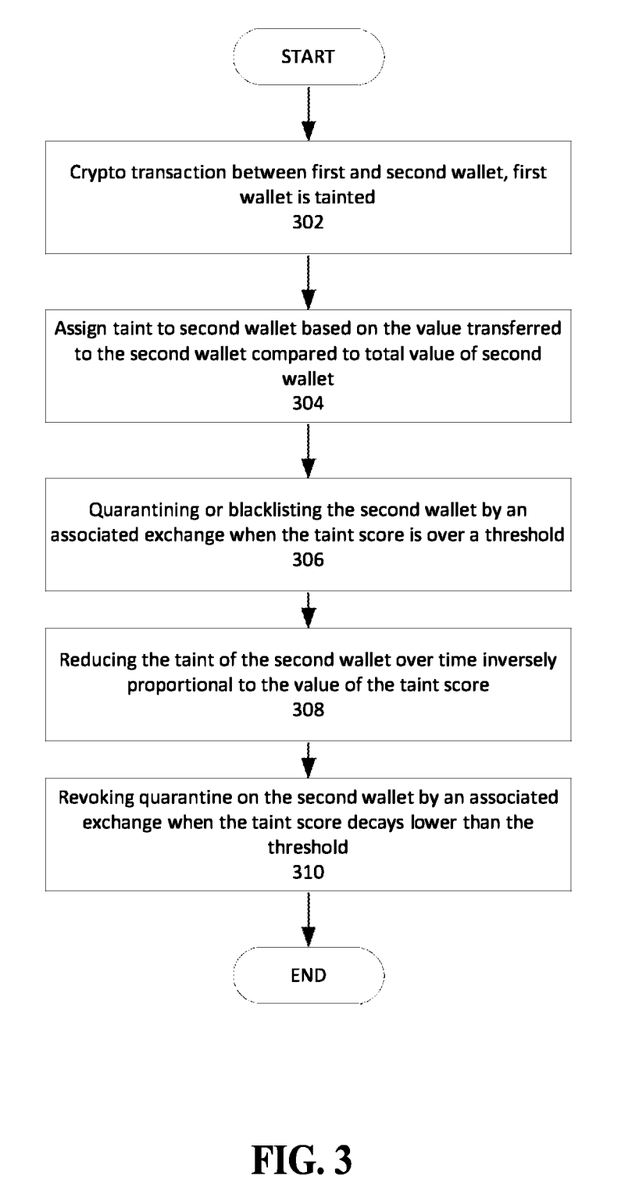
FIG. 3 is a flowchart illustrating assignment of AddressScores.

FIG. 3 illustrates identification of an AddressScore.

AddressScore Philosophy

In some embodiments, an AddressScore is binary. In these embodiments, the AddressScore is either 0 for safe or 1 for unsafe. The labelling for the AddressScore is sourced from government new releases and websites, publicly available cryptographic object blockchain explorer websites, and Mechanical Turks. A fourth source is tracing from other unsafe cryptographic identifiers (e.g., intrinsic to extrinsic). Where a given address shifts a threshold percentage (of total held by that address) or a threshold number of cryptographic objects to a second address, the second address is automatically updated to a "1" and designated unsafe. In some embodiments, sample thresholds may be 50%, 75% or 100%. Events or transactions including cryptographic identifiers that are unsafe (1) are excluded from processing by the filter node.

In some embodiments, the AddressScore operates on a spectrum (from 0 to 1 rather than a binary value). There are several nuances to defining an AddressScore. In particular, an AddressScore should satisfy these constraints:

A) Permit the intrinsic AddressScore of a given wallet to affect the AddressScore of another wallet—having no intrinsic AddressScore—to which the other wallet is connected by multiple hops.

B) Arrange so that the intrinsic AddressScore of a given wallet does not diminish over time and hops yet diminishes immediately upon seizure by law enforcement.

C) Accommodate varying views of what constitutes criminal versus suspicious activity, as in the case of gambling.

D) Accommodate varying degrees of evidence of criminal activity, from direct to circumstantial to hearsay. Evidence comes from numerous channels include direct reports from the entity themselves. Each channel is given a confidence score. Self-reporting or reports by law enforcement are treated as trusted sources.

E) Arrange so that a wallet's AddressScore is proportional to criminal intent, as in the case of a scam victim who unwittingly sends funds to a scammer, or someone who receives an iota of heist proceeds through an airdrop—neither of which should suffer an increase in AddressScore.

F) Arrange so that a wallet's AddressScore reflects the proportion of funds exchanged with wallets carrying some amount of intrinsic risk, perhaps as well as the volume thereof.

Spectrum AddressScore

The AddressScore of a wallet (without intrinsic risk) as the proportion of funds that wallet has received from or sent to, possibly indirectly, nearby wallets with intrinsic risk. The AddressScore comprises values from 0 to 1, with 0 denoting "negligible risk" (since evidently none of the given wallet's in/outflow is traceable to a wallet with known criminal association) and 1 denoting "high risk" (since evidently all of the given wallet's in/outflow is traceable to wallets with known criminal association).

It is incorrect to conclude that the funds passed to or from a specified wallet are directly related to criminal activity. That said, receiving funds from a criminally-associated wallet is a form of money laundering, and sending funds to such a wallet is a form of funding crime—even if inadvertent or unwitting.

The system computes the influence of every wallet on every other wallet by looking at the proportional provenance and destination of funds flowing through each wallet. Influence of each wallet on each other is similar to the function of page-rank for search engines on the Internet, but for the propagation of cryptographic objects. The system can then use vectorized "influences" for any number of things, including but not limited to the propagation of criminality, flow of taint, or influence of a particular actor on the network.

In some embodiments, taint is passed on the basis of how tainted a given wallet is and how much of the content of the wallet is transacted. When taint is said to be "passed" the original wallet does not lose taint. Taint is conserved. A limited set of actions, or non-actions reduce taint. For example, reported seizure by law enforcement may remove taint from a wallet. Taint may be removed over time. The rate upon which taint is lost may be proportional to the current level of taint. For example, a wallet that is 1% tainted may lose that taint over a period of time (perhaps a year), while a wallet that is 100% tainted may require well over the lifespan of the average human to become untainted.

In step 302, a cryptographic event occurs between two cryptographic identifiers. The first of these identifiers is tainted. In step 304, the system assigns to the second identifier taint (e.g., that influences AddressScore) compared to the total value of the second identifier. The more tainted cryptographic objects are shifted to the second identifier, the more tainted the second identifier becomes.

In step 306, based on the new AddressScore of the second identifier, the system either an exchange or a filter node quarantines or blacklists the second identifier. A quarantined identifier cannot transact further with the exchange, and a blacklisted identifier will not have events included into blocks by a filter node.

In step 308, the taint of the second identifier is reduced overtime inversely proportional to the value of the AddressScore. That is, an AddressScore of 1 will not reduce at an appreciable rate (except in cases where law enforcement confiscates), but an AddressScore of 0.1 may reduce to 0 in cases where no further tainted actions occur.

In step 310, the quarantine or blacklist may be reversed once the second identifier decays below a given threshold.

EXAMPLES

1) A given wallet directly received the proceeds of a heist. The direct knowledge of its criminality automatically gives it an intrinsic AddressScore of 1, obviating the need to inspect its transactional neighborhood.

2) 100% of a given wallet's incoming funds are traceable to a wallet that directly received proceeds of a heist. The given wallet is given an extrinsic AddressScore of 1, derived from its relationship with the heist.

3) A reputable exchange harbors a deposit address that has directly received all the proceeds of a heist. If the exchange immediately quarantines that wallet so that there is no topological connection between the deposit address and its own wallet, the exchange's own extrinsic AddressScore will not be elevated. But if the exchange absorbs the heist proceeds and treats the value no differently from any other incoming value, the exchange is now complicit in money laundering, and the exchange wallet's extrinsic AddressScore will be related to the fraction of all funds ever coming into the exchange that came from the heist.

4) Where 1% of the income of a wallet comes from a 100% tainted wallet. The receiving wallet becomes 1% tainted.

5) Where 50% of the cryptographic object content of a 70% tainted wallet transacts, 35% taint is passed (70% of 50% is 35%).

6) Where 5% of the value ever sent from a given private wallet was paid to a dark market in a well-documented transaction that conveys criminal intent. That wallet is given an extrinsic AddressScore of 0.05, the proportion of its total funds sent that were intended for criminal activity.

7) In some embodiments, where 5% of the value ever to leave a given private wallet was paid to a ransom address. The paying wallet's extrinsic AddressScore is arguably 0, since the system is reluctant to hold victims accountable. (Other embodiments might assign some taint to the wallet, because it facilitated the crime.).

Implementation

Curation:

(1) Manually curate a set of address-entity associations—a record of addresses known to belong to particular entities.

(2) Manually map each entity to a category, resulting in a set of address-category associations.

(3) Assign each category an optional AddressScore, resulting in particular addresses being endowed with some level of intrinsic risk.

Curation is performed via data gathering. The system gathers address-entity associations through a variety of methods including: Manually perform transactions with known entities (e.g., exchanges, gambling sites, and mixers); purchase data sets from, and entering data-sharing agreements with, trusted parties; crawl sources of structured and unstructured labeled data; engage in sleuthing on the dark web (e.g., via Tor); transcribe published reports from news media and social media; ingest data shared by Blockseer users.

Each method and source are assigned a confidence level, so that the system can resolve conflicts (such as when an address is given conflicting labels). From raw sources, we derive a canonical set of several hundred entities, corrected for misspellings, alternate spellings, and historical changes of hands. Then, each of those entities is assigned a category, chosen from a canonical set of roughly thirty categories. Each category is assigned a (configurable) AddressScore between 0 and 1—or none at all.

Classification: Cluster addresses into wallets and extend the curated address-entity/category/risk associations to those wallets. Some cryptographic identifiers act together or operate using the same controller. In these cases, the cryptographic identifiers should be similarly grouped together for purposes of assigning AddressScores.

The Classification project has two ultimate outputs. First, a partition of the full set of addresses into wallets. Second, a mapping from a subset of those wallets to entities/categories/risk levels. Semi-supervised Address Classification groups addresses together based on compelling topological heuristics, and then classifies these groups by extending each address-entity/category/risk association to the other addresses in its group.

In some embodiments, the semi-supervised classification of addresses takes advantage of the "shared inputs" heuristic—grouping addresses that are inputs into the same transaction—and then applying the curated associations to these clusters.

In other embodiments, the heuristic includes an exception is the case of a heist, in which a stolen address gets cleaved from other addresses with which the stolen address has been a shared input into a transaction. Another exception comes from an early practice by some exchanges of permitting customers to upload their own addresses, rather than for the exchange to provide a deposit address. This resulted in the customers' addresses mingling with other addresses in the exchange, rendering the shared inputs heuristic irrelevant.

After forming groups of addresses using topological heuristics, the system extends each address-entity association to the rest of its group.

Supervised Transaction Classification transforms to transaction space—by assigning each transaction the class of that transaction's input addresses and uses supervised classification to map a larger set of transactions to entities, and then transform back to address space—by assigning each address the class(es) of the transactions emanating from it.

The supervised classification extends the classification to a larger set by analyzing patterns within and between transactions. Indeed, institutional entities (e.g., mixers and exchanges) generate distinctive transactions, and it's reasonable that "clumps" of transactions that look similar might belong to the same entity.

In particular, the system defines features that describe transactions and their topological neighborhoods (embedded in a sufficiently high-dimensional vector space), and then use any of the conventional classification algorithms to produce a mapping from transactions to entities or categories. Examples of intra-transactional features are:

number and ratio of transaction inputs and outputs;
transaction value scale and precision;
change address likelihood;
fee size and percentage; or input and output value distribution.

To identify inter-transactional topological features, the system follows random paths through the transaction graph, and then embeds these paths in a high-dimensional vector space. The intuition is that paths emanating from different transactions in the same class should land near one another. Assigning a transaction the same class as any of its input addresses puts us in a position us to employ any number of supervised classifications algorithms.

After classifying the full set of transactions, the system then transforms back to address space, applying a transaction class to its input addresses.

Finally, the quality of a mapping is measured by a suitable multi-class generalization of any of the usual classification metrics: accuracy, precision and recall, ROC AUC, F1 score, etc.

Risk Propagation: Devise a formula that proportionately propagates risk from wallets with quantified taint to all wallets. Given a directed graph of wallets in which each edge is labeled by the aggregate transaction value from one wallet to another and each node is labeled by its flow—the aggregate sum of its sent and received values over time, as well as its intrinsic AddressScore (possibly null).

A result of the "Classification" described above is the directed graph with nodes labeled by taint, and it is a routine calculation to add the other labels. Given this graph, taint is propagated according to two proportional flow matrices per wallet, calculated from the data above. The outflow matrix $F_O$ records the fraction of $W_A$'s flow that was sent to $W_B$. The inflow matrix $F_I$ records the fraction of $W_A$'s flow that came from $W_B$. Interpretation: in the case that $W_B$ is intrinsically risky, the first matrix approximates $W_A$'s culpability for funding B's criminal activity, and the second matrix approximates $W_A$'S culpability for laundering $W_B$'s dirty funds.

Naturally, risk can propagate beyond immediate neighbors, and to those neighbors' neighbors. Raising either proportional flow matrix to the nth power calculates the fraction of funds that went to (or came from) a given wallet's n-hop neighbors. Altogether, a wallet's risk is propagated to its 1-hop neighbors, its 2-hop neighbors, and so on.

Finally, this total flow matrix is multiplied by the vector of each node's intrinsic taint (replacing null values with 0), to yield all other nodes' extrinsic taint.

Figure 4:
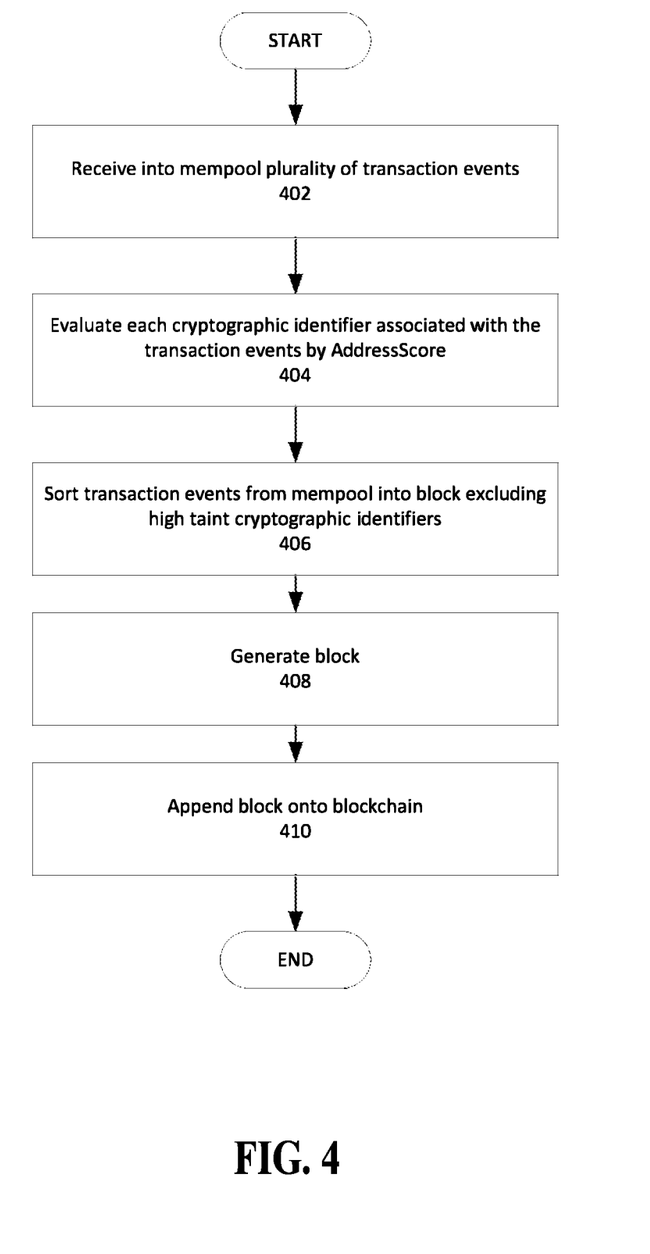
FIG. 4 is a flowchart illustrating exclusion of cryptographic identifiers from inclusion into blocks.

FIG. 4 is a flowchart illustrating exclusion of cryptographic identifiers from inclusion into blocks. In step 402, the mempool for the distributed consensus network receives a plurality of transaction events. The mempool is made up of a number of nodes. The mempool for each node may differ. A group of nodes may assemble together into a pool, that works together. The nodes of a pool are operated by ASIC hashing processors specifically designed to compute hash values efficiently. The nodes operating the method described herein are filter nodes.

Each of the transaction events include a cryptographic identifier associated with an input and/or and output of the transaction. Some transaction events include additional cryptographic identifiers. The cryptographic identifiers are often referred to as "public keys." The transaction events are collected together (based on memory size) and used to form blocks in a blockchain.

In step 404, the filter nodes that make up the pool of hashing processors evaluate each of the transaction events in the mempool based on each respective cryptographic identifier used by each of the transaction events. The cryptographic identifiers are evaluated based on AddressScore. In some embodiments, the evaluation is binary: 0 passes, and 1 fails. In other embodiments, the evaluation is threshold based relating to a score between 0 and 1.

In some embodiments, the evaluation is performed as a comparison to a list of cryptographic identifiers that meet the requirements for failure. The evaluation is performed on a constant basis as new transaction events are added to the mempool. The evaluation identifies those transaction events that fail and excludes them from the next step.

In some embodiments, the transaction events that fail are discarded from the mempool. Discarding the transactions alters the mempool with respect to a mempool that other nodes that are not part of the pool would otherwise see. Discarding transaction events reduces computation complexity in that the evaluation would not be performed on the same transaction event already in the mempool more than once. Simultaneously, the evaluation may be performed at receipt of a given transaction event to the mempool.

However, because of the difference in mempools across the distributed consensus network, other pools may continuously share previously discarded transaction events to the filter node mempool. In this circumstance, the transaction event would be repeatedly discarded on receipt. Where a significant fraction of the distributed consensus network operates filter nodes that discard failing transaction events, those transactions that fail may not propagate as well causing these transactions to be further suppressed. In these cases, it is possible those transactions that fail will not be shared to the mempool of nodes that would not have otherwise filtered out the transaction event.

In step 406, the filter nodes sorts through the plurality of events and identifies those to include into a block. Those transactions that failed at step 404 are expressly excluded from inclusion into the block. The exclusion may be because the transaction event is no longer in the filter node's mempool or because those transactions have been screened.

In step 408, the filter node generates the block using those transaction events that have been sorted for inclusion. In step 410, the newly generated block is appended to the blockchain.

Figure 5:
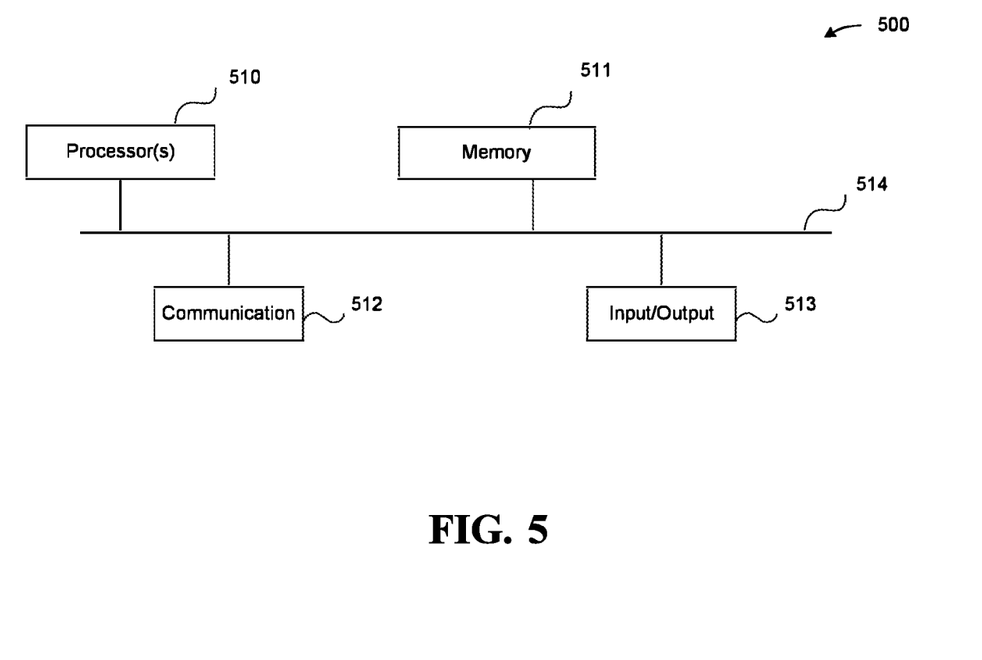
FIG. 5 is a block diagram of an exemplary computing system.

FIG. 5 is a high-level block diagram showing an example of a processing device 500 that can represent a system to run any of the methods/algorithms described above. A processing device used to "mine" cryptographic objects is often evaluated based on a hash rate and an electrical power efficiency. A system may include two or more processing devices such as represented in FIG. 5, which may be coupled to each other via a network or multiple networks. A network can be referred to as a communication network.

In the illustrated embodiment, the processing device 500 includes one or more processors 510, memory 511, a communication device 512, and one or more input/output (I/O) devices 513, all coupled to each other through an interconnect 514. The interconnect 514 may be or include one or more conductive traces, buses, point-to-point connections, controllers, scanners, adapters and/or other conventional connection devices. Each processor 510 may be or include, for example, one or more general-purpose programmable microprocessors or microprocessor cores, microcontrollers, application specific integrated circuits (ASICs), programmable gate arrays, or the like, or a combination of such devices. The processor(s) 510 control the overall operation of the processing device 500. Memory 511 may be or include one or more physical storage devices, which may be in the form of random-access memory (RAM), read-only memory (ROM) (which may be erasable and programmable), flash memory, miniature hard disk drive, or other suitable type of storage device, or a combination of such devices. Memory 511 may store data and instructions that configure the processor(s) 510 to execute operations in accordance with the techniques described above. The communication device 512 may be or include, for example, an Ethernet adapter, cable modem, Wi-Fi adapter, cellular transceiver, Bluetooth transceiver, or the like, or a combination thereof. Depending on the specific nature and purpose of the processing device 500, the I/O devices 513 can include devices such as a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Physical and functional components (e.g., devices, engines, modules, and data repositories, etc.) associated with processing device 500 can be implemented as circuitry, firmware, software, other executable instructions, or any combination thereof. For example, the functional components can be implemented in the form of special-purpose circuitry, in the form of one or more appropriately programmed processors, a single board chip, a field programmable gate array, a general-purpose computing device configured by executable instructions, a virtual machine configured by executable instructions, a cloud computing environment configured by executable instructions, or any combination thereof. For example, the functional components described can be implemented as instructions on a tangible storage memory capable of being executed by a processor or other integrated circuit chip (e.g., software, software libraries, application program interfaces, etc.). The tangible storage memory can be computer readable data storage. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

The invention claimed is:

1. A method of operating a pool of hashing processors ("hashing processors") comprising:
   receiving, by the pool of hashing processors from a mempool, a plurality of events, wherein the mempool is a collective memory of nodes in a distributed consensus network, wherein the pool of hashing processors has associated memory that contributes a portion of the collective memory of the mempool;
   determining, by the pool of hashing processors, that the received plurality of events are associated with a cryptographic identifier;
   based on said determining, sorting, by the pool of hashing processors, the plurality of events based on each respective cryptographic identifier associated with each respective event of the plurality of events;
   based on said sorting, determining, by the pool of hashing processors, events of the plurality of events to include in a subset of the plurality of events, wherein those events associated with a predetermined list of cryptographic identifiers are selectively excluded from the subset;
   determining, by the pool of hashing processors, an association of events in the mempool with the predetermined list of cryptographic identifiers;
   based on said determining, by the pool of hashing processors, of an association of events in the mempool with the predetermined list of cryptographic identifiers, discarding, by the pool of hashing processors, those events from the portion of the collective memory of the mempool associated with the pool of hashing processors;
   generating, by the pool of hashing processors, a block data structure on a blockchain data structure including the subset; and
   propagating, by the pool of hashing processors, the block data structure including the subset within the mempool.

2. The method of claim 1, further comprising:
   discarding, by the pool of hashing processors, events including cryptographic identifiers included on the predetermined list of cryptographic identifiers from the plurality of events.

3. The method of claim 2, wherein the block data structure is a first block data structure, the method further comprising:
   subsequent to generation of the first block data structure, sorting, by the pool of hashing processors, a remaining plurality of events to include in a second subset to include within a second block data structure; and generating, by the pool of hashing processors, the second block data structure including the second subset.

4. The method of claim 1, wherein the predetermined list is based on an automated web crawler operating on a blockchain explorer.

5. The method of claim 1, wherein the predetermined list is based on operations performed by mechanical turks.

6. The method of claim 1, wherein the predetermined list is based on governmental entity list.

7. The method of claim 1, wherein the predetermined list is based on a criminality score of the cryptographic identifier.

8. The method of claim 1, further comprising:
generating the predetermined list of cryptographic identifiers based on a web crawler parsing text of websites for cryptographic identifiers paired with textual references to criminality.

9. The method of claim 1, wherein each of the plurality of events include at least two cryptographic identifiers including a first cryptographic identifier and a second cryptographic identifier each associated with users.

10. The method of claim 9, wherein each event shifts a unique cryptographic object between the first cryptographic identifier and the second cryptographic identifier.

11. A system of operating a pool of hashing processors ("hashing processors") comprising:
a pool of hashing processors configured to receive, via a network interface, a plurality of events each associated with a cryptographic identifier, wherein the pool of hashing processors is configured to generate a block data structure on a blockchain data structure based on a subset of the plurality of events; and
a memory including a predetermined list of cryptographic identifiers and instructions that when executed cause the pool of hashing processors to sort the plurality of events based on each respective cryptographic identifier associated with the plurality of events, wherein the sorting identifies events of the plurality of events to include in the subset where those events associated with the predetermined list of cryptographic identifiers are selectively excluded from the subset, and the instructions further cause the pool of hashing processors to discard those events associated with the predetermined list of cryptographic identifiers from a portion of a mempool associated with the pool of hashing processors, generate the block data structure including the subset, and propagate the block data structure including the subset within the mempool, wherein the mempool is a collective memory of nodes in a distributed consensus network.

12. The system of claim 11, wherein the pool of hashing processors comprises mining ASICs.

13. The system of claim 11, wherein the predetermined list is based on an automated web crawler operating on a blockchain explorer.

14. The system of claim 11, wherein the predetermined list is based on operations performed by mechanical turks.

15. The system of claim 11, wherein the predetermined list is based on governmental entity list.

16. The system of claim 11, wherein the predetermined list is based on a criminality score of the cryptographic identifier.

17. A non-transitory computer-readable storage medium storing instructions that, when executed by a computing system, cause the computing system to perform a process comprising:
receiving, by a pool of hashing processors from a mempool, a plurality of events, wherein the mempool is a collective memory of nodes in a distributed consensus network, wherein the pool of hashing processors has associated memory that contributes a portion of the collective memory of the mempool;
determining, by the pool of hashing processors, that the received plurality of events are associated with a cryptographic identifier:
based on said determining, sorting, by the pool of hashing processors, the plurality of events based on each respective cryptographic identifier associated with each respective event of the plurality of events;
based on said sorting, determining, by the pool of hashing processors, events of the plurality of events to include in a subset of the plurality of events, wherein those events associated with a predetermined list of cryptographic identifiers are selectively excluded from the subset;
determining, by the pool of hashing processors, an association of events in the mempool with the predetermined list of cryptographic identifiers;
based on said determining, by the pool of hashing processors, of an association of events in the mempool with the predetermined list of cryptographic identifiers, discarding, by the pool of hashing processors, those events from the portion of the collective memory of the mempool associated with the pool of hashing processors;
generating, by the pool of hashing processors, a block data structure on a blockchain data structure including the subset; and
propagating, by the pool of hashing processors, the block data structure including the subset within the mempool.

18. The non-transitory computer-readable storage medium of claim 17, further comprising:
discarding, by the pool of hashing processors, events including cryptographic identifiers included on the predetermined list of cryptographic identifiers from the plurality of events.

19. The non-transitory computer-readable storage medium of claim 18, wherein the block data structure is a first block data structure, further comprising:
subsequent to generation of the first block data structure, sorting, by the pool of hashing processors, a remaining plurality of events to include in a second subset to include within a second block data structure; and
generating, by the pool of hashing processors, the second block data structure including the second subset.

20. The non-transitory computer-readable storage medium of claim 17, wherein each of the plurality of events include at least two cryptographic identifiers including a first cryptographic identifier and a second cryptographic identifier each associated with users.

* * * * *